Jan. 2, 1968     KENZO ISHIMARU     3,361,026
CONTINUOUS FLOW CUVETTE

Filed Jan. 30, 1963     2 Sheets-Sheet 1

INVENTOR.
KENZO ISHIMARU
BY
*Flehr and Swain*
ATTORNEYS

INVENTOR.
KENZO ISHIMARU
BY
*Flehr and Swain*
ATTORNEYS

United States Patent Office 3,361,026
Patented Jan. 2, 1968

3,361,026
CONTINUOUS FLOW CUVETTE
Kenzo Ishimaru, San Jose, Calif., assignor to Beckman Instruments, Inc., a corporation of California
Filed Jan. 30, 1963, Ser. No. 254,917
3 Claims. (Cl. 88—14)

This invention relates to a cuvette and more particularly to a cuvette, of the continuous flow type, for analyzing liquids in a spectrophotometer.

In considering liquids to be viewed in a spectrophotometer, several factors must be taken into account. First, it is known that the accuracy of a spectrophotometer depends, at least to some extent, on the optical path length through the sample to be analyzed. The greater this optical path length, the better the accuracy of the spectrophotometer. Also the resolution of the spectrophotometer is increased when the cuvette and lines are small because mixing and turbulence are kept to a minimum.

Since the sample to be analyzed is frequently relatively expensive or difficult to obtain, it is not practical to use large diameter lines throughout a continuous flow system. Consequently various means have been provided for providing an increase optical path when employing small volumes of liquid. None of the prior art means have been entirely satisfactory.

Another problem in the use of micro cuvettes occurs when the liquid or effluent to be analyzed is cold relative to the ambient temperature. When viewing the liquid, any condensate which forms on the window scatters and absorbs selectively the light whereby erroneous readings may result.

It is, therefore, a general object of this invention to provide an improved cuvette for use with spectrophotometers and the like.

It is a more particular object of this invention to provide an improved cuvette having an increased optical path length.

It is another object of the invention to provide an improved cuvette of the aforementioned character wherein turbulent flow of the sample to be analyzed is prevented.

It is another object of the invention to provide a cuvette of the aforementioned character together with means for preventing the formation of condensate when cold samples are employed.

These and other objects and features of the invention will become more clearly apparent upon a review of the following description in conjunction with the accompanying drawing, in which.

Figure 3:
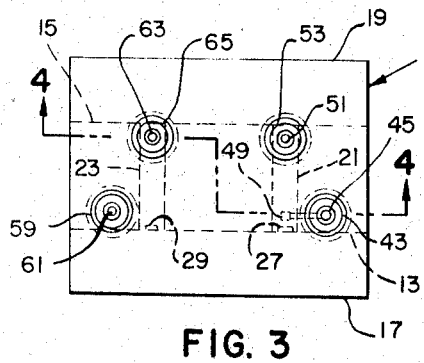
FIGURE 3 is a top view of the body shown in FIGURE 1.
Figure 1:
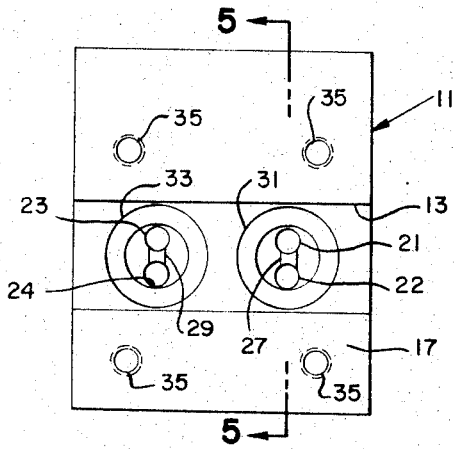
FIGURE 1 is a front elevational view of a cuvette body in accordance with this invention.

Referring to the figures, it is noted that the cuvette body 11 includes a block having substantially rectangular recesses 13 and 15 in the front and rear walls 17 and 19 thereof. Holes 21 through 24 are bored through the body portion connecting the recesses 13 and 15 and forming paths for the fluid to be analyzed. A groove 27 interconnects the holes 21 and 22 in the forward recess 13 while a groove 29 interconnects the holes 23 and 24 in the same forward recess 13.

Disposed about the opening of the holes 21 and 22 in the forward recess 13 is an annular shaped groove 31. A similar groove 33 is located about the holes 23 and 24. About the openings of the holes 21 and 22 within the rear recess 15 is another annular shaped groove 34 and a similar groove 36 is located about the holes 23 and 24 in the rear recess 15. Threaded openings 35 serve to secure a mount 37 while the threaded openings 39 serve to secure a clamping plate 41.

Figure 4:
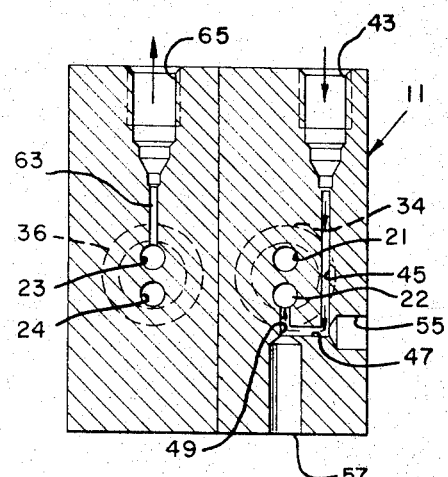
FIGURE 4 is a sectional view taken along the line 4—4 of FIGURE 3.
Figure 5:
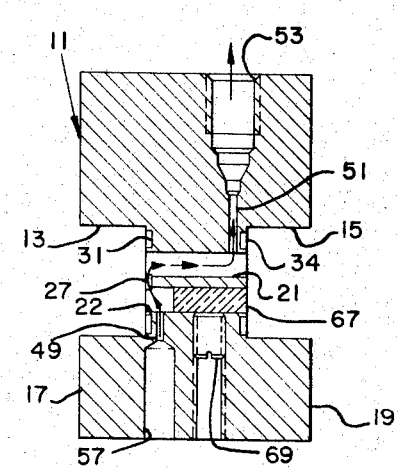
FIGURE 5 is a sectional view taken along the line 5—5 of FIGURE 1.

As can be better seen in FIGURES 3, 4 and 5 the holes 21 and 22 together provide a single line of flow for a sample to be analyzed. Referring to FIGURE 4, only the right hand portion of the body will be considered, that portion being a mirror image of the lefthand portion. The inlet of the fluid includes an opening 43 at the top of the body communicating with a line 45 to a point below the hole 22. From the line 45 fluid passes along a line 47 to an upwardly extending line 49. From the line 49 the fluid passes along the hole 22, up the groove 27 (FIGURE 5), along the hole 21 and upward through a line 51 to an exhaust port 53. The body 11 further includes bores 55 and 57 which provide manufacturing access for the lines 47 and 49 respectively. The bores 55 and 57, after drilling the lines 47 and 49, may be plugged by any convenient means.

The left hand side of the cuvette, as seen in FIGURES 3 and 4, is similar to the righthand side wherein fluid is passed first into the bore 24, along the groove 29 and through the bore 23. It is first passed into the inlet port 59 and line 61 to the bottom bore 24 and upward through groove 29 to the upper bore 23. From the upper bore 23 the fluid is passed out the line 63 and exhaust port 65.

As can be seen particularly in FIGURE 5, the optical path length of the fluid in the bore 22 may be varied by the insertion of a translucent plug 67, such as of quartz, which is secured by a screw 69. Thus two different optical path lengths may be presented for the same fluid.

Figure 2:
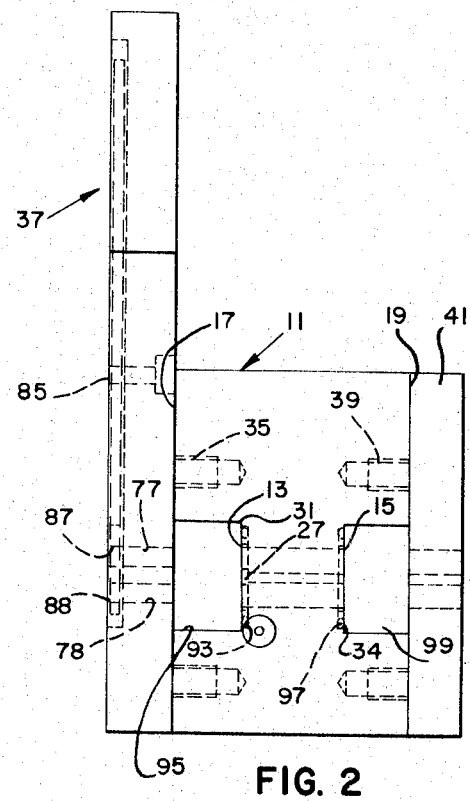
FIGURE 2 is a side elevational view of a cuvette body as shown in FIGURE 1 together with a body mount for joining the cuvette to a spectrophotometer.
Figure 7:
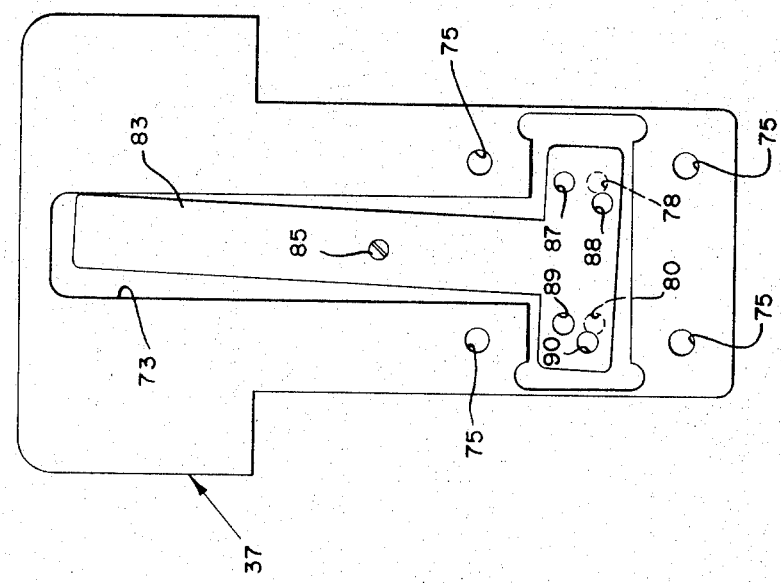
FIGURE 7 is a front elevational view of the mount shown in FIGURE 6 together with a shutter assembly.
Figure 6:
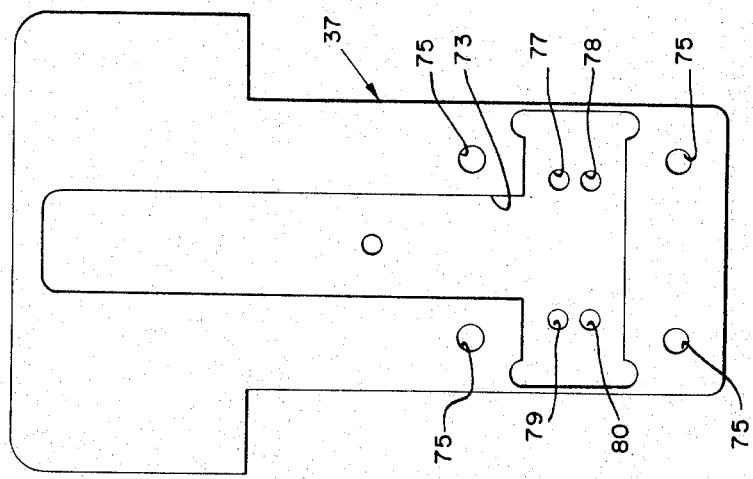
FIGURE 6 is a front elevational view of the mount shown in FIGURE 2.

In the assembly of the complete cuvette the block 11 has secured thereto a mount 37 which is more clearly seen in FIGURES 6 and 7. The mount includes a generally T-shaped recess 73 as well as mounting holes 75 which when the mount is superimposed on the body 11 as shown in FIGURE 2, lie in registry with the mounting holes 35 of the body. Within the lower portion of the T-shaped groove 73 are situated through openings 77 through 80, corresponding to the holes 21 to 24 in the body 11.

A T-shaped shutter 83 is fitted within the recess 73 and pivoted about a screw or stud 85. The T-shaped shutter includes openings 87 to 90 corresponding to the openings 77 to 80. It should be noted, however, that the openings 87 and 88 are offset such that when the shutter 83 is in the position as shown in FIGURE 7, the opening 87 lies in registry with the opening 77 but the opening 88 is out of registry with the opening 78. Likewise the openings 89 lie in registry with the opening 79, while the opening 90 is displaced from the opening 80.

When the shutter is rotated about the point 85 the holes 88 and 90 are placed in registry with the openings 78 and 80 while, at the same time, the openings 77 and 79 are closed. Thus, it is seen that in the position of the shutter as shown in FIGURE 7, there are lines of sight through the openings 87 and 89 in the shutter 83, the openings 77 and 79 in the mount 37, and the holes 21 and 23 in the body 11. When the shutter is rotated the lines of sight lie between the openings 88 and 90 in the shutter, the openings 78 and 80 in the mount and the holes 22 and 24.

In assembling the mount 37 to the body 11, O-ring seals 93 are placed within the grooves 31 and 33. A translucent bar 95 such as of quartz, is located within the recess 13 to form a window and the mount 37 is superimposed over both the bar 95 and front face 17 of the body 11.

In addition, O-rings 97 are placed in the grooves 34 and 36 and an additional quartz bar 99 is located within the recess 15 to form an additional window. The mounting clamp 41 is then screwed on the rear face 19 of the body 11.

The quartz bars or windows 95 and 99 are made relatively thick, that is, on the order of ⅛″ to ¼″ or more, so as to prevent condensate from forming on the windows themselves. Thus with the mount 37 being at ambient temperature and fluid within the body 11 being cold, a temperature gradient is set up across the quartz bars 95 and 99. With the temperature gradient so set up the dew point lies within the bar itself, rather than at its surface and condensation does not occur.

Thus considering the assembly as shown in FIGURE 2 a spectrophotometer may be employed wherein light is shown through either the left or the right side and an analyzing element placed on the other. Since the liquid to be analyzed is viewed in a direction longitudinal to the direction of its flow a relatively long optical path length is provided and as shown is the full length of the holes 21 or 23. In addition, shorter optical path lengths can be provided by placing the quartz plugs such as 67 in the hole 22. By using the shutter 83, different path lengths of the same fluid may be viewed consecutively.

I claim:
1. A continuous flow cuvette for use in an instrument comprising
   a body member, said body member defining axially side by side first and second substantially elongated holes, said second hole having translucent means disposed therein to seal off a portion of the second hole, the unsealed portion of said second hole being shorter in length than said first hole;
   means communicating with said second hole intermediate the ends thereof for passing sample fluid into said unsealed portion of said second hole;
   means interconnecting one end of said unsealed portion of said second hole with one end of said first hole for passing said sample fluid from said unsealed portion of said second hole to said first hole;
   means communicating with the other end of said first hole for passing said sample fluid out of said first hole;
   a window disposed at each end of said first and second holes defining a line of sight substantially axially of said holes along the line of flow of said sample fluid in each hole, each window being of sufficient thickness that, with the sample fluid at a temperature below ambient temperature, the dew point temperature lies at a point between the parallel viewing surfaces of the window; and
   clamping means for securing each window to said body member, at least one of said clamping means also serving to mount the cuvette to said instrument, whereby condensation of moisture does not occur on the windows, although the cuvette body member is maintained at an ambient temperature above, and independent of, the temperature of the sample fluid.

2. A continuous flow cuvette as defined in claim 1 in which
   said translucent sealing means comprises a removable translucent plug which is interchangeable with translucent plugs of various lengths.

3. A continuous flow cuvette as defined in claim 1 including
   movable shutter means disposed to selectively interrupt the line of sight through said first or second hole.

References Cited
UNITED STATES PATENTS

| | | | |
|---|---|---|---|
| 1,635,470 | 7/1927 | Exton | 88—14 |
| 2,462,995 | 3/1949 | Ritzmann | 88—14 |
| 2,496,333 | 2/1950 | Cary et al. | 88—14 |
| 2,594,113 | 4/1952 | Askin | 88—14 |
| 2,612,608 | 9/1952 | Miller | 88—14 |
| 2,970,513 | 2/1961 | Waters | 88—14 |
| 3,194,111 | 7/1965 | Saunders | 88—14 |
| 3,236,602 | 2/1966 | Isreeli | 88—14 |

JEWELL H. PEDERSEN, *Primary Examiner.*

RONALD L. WIBERT, *Examiner.*